United States Patent
Tanaglia et al.

(10) Patent No.: US 6,403,739 B1
(45) Date of Patent: Jun. 11, 2002

(54) SUPPORTED CATALYTIC SYSTEM FOR THE PRODUCTION OF ETHYLENE PROPYLENE COPOLYMERS

(75) Inventors: Tiziano Tanaglia, Bologna; Gianni Loberti, Porotto, both of (IT)

(73) Assignee: Enichem Elastomeri Srl, Milan (IT)

( * ) Notice: Subject to any disclaimer, the term of this patent is extended or adjusted under 35 U.S.C. 154(b) by 0 days.

(21) Appl. No.: 08/557,842

(22) Filed: Nov. 14, 1995

(30) Foreign Application Priority Data

Dec. 15, 1994 (IT) ................................................ 002528

(51) Int. Cl.⁷ ............................. C08F 4/68; C08F 236/20
(52) U.S. Cl. ..................... 526/169.2; 526/127; 526/129; 526/339; 502/108
(58) Field of Search ................................. 526/129, 127, 526/169.2, 339

(56) References Cited

U.S. PATENT DOCUMENTS

| | | | |
|---|---|---|---|
| 3,166,542 A | * 1/1965 | Orzechowski et al. | 526/129 |
| 3,370,052 A | * 2/1968 | Mostardini et al. | 526/902 |
| 3,883,492 A | * 5/1975 | Delbouille et al. | 526/124.2 |
| 4,325,837 A | * 4/1982 | Capshew et al. | 526/904 |
| 4,579,836 A | * 4/1986 | Arzoumanidis et al. | 526/904 |
| 5,177,042 A | * 1/1993 | Cann et al. | 526/129 |
| 5,374,695 A | 12/1994 | Tanaglia et al. | |
| 5,376,743 A | * 12/1994 | Baker et al. | 526/904 |
| 5,416,053 A | * 5/1995 | Bai et al. | 526/129 |
| 5,480,850 A | * 1/1996 | Cann et al. | 526/129 |

FOREIGN PATENT DOCUMENTS

| | | |
|---|---|---|
| EP | 0 349 927 | 1/1990 |
| EP | 0 372 926 | 6/1990 |
| EP | 0 375 199 | 6/1990 |
| WO | WO 94/24173 | 10/1994 |

\* cited by examiner

*Primary Examiner*—David W. Wu
*Assistant Examiner*—R. Rabago
(74) *Attorney, Agent, or Firm*—Oblon, Spivak, McClelland, Maier & Neustadt, P.C.

(57) ABSTRACT

Catalytic component for the polymerization of ethylene with propylene prepared by:

a) impregnation of an inert support with a solution of a compound of Vanadium having an oxidation state of between 3 and 5;

b) subsequent treatment with a solution of a compound having general formula (I) $R_n AlX_m$ wherein R is a $C_1$–$C_{20}$ alkyl radical, X is a halogen, n+m=3, and m is an integer between 0 and 2, the molar ratio between Aluminium in step (b) and Vanadium in step (a) being from 1/1 to 6/1.

10 Claims, No Drawings

SUPPORTED CATALYTIC SYSTEM FOR THE PRODUCTION OF ETHYLENE PROPYLENE COPOLYMERS

The present invention relates to a catalytic component based on Vanadium supported on an inert solid matrix, which can be used in the production of ethylene propylene (EP) elastomers and ethylene propylene diene (EPDM) terpolymers in processes of the heterogeneous type as the suspension or the gas phase, preferably in suspension.

Elastomers which can be obtained using the catalytic component of the present invention are characterized by a better morphology and the polymerization process is characterized by a substantial absence or large reduction in the fouling of the reactor.

The first document which describes supported catalysts based on Vanadium, useful for the preparation of EP elastomers, is GB-A-1.309.303. Elastomeric polymers are produced in a liquid medium consisting of one of the monomers and in the presence of a supported catalyst of the Ziegler-Natta type comprising a halide of a metal belonging to groups IVB, VB, VIB and an organometallic compound.

GB-A-2.105.355 describes the use of supported catalysts based on Vanadium in the preparation of EP elastomers in gas phase. The support is selected from inorganic oxides and mixed oxides such as silica, alumina, Magnesium oxide, Titanium oxide and aluminium silicates; carbon black; zeolites; silicon carbide; minerals containing magnesium, aluminium and silicon, such as talc and kaolin. The above inert support is impregnated with an Aluminium alkyl, preferably chlorinated, and an oleosoluble compound of Vanadium (III) or (V). The molar ratio Al/V is between 10/1 and 200/1, preferably between 20/1 and 60/1.

U.S. Pat. No. 5,002,916 describes a catalytic component supported on an inert matrix, represented by the formula:

(A) $(V_3O(RCO_2)_6(ED)_3)_2 \cdot V_2O_2X_6$ or (B) $V_3O(RCO_2)_6(ED)_3$ wherein
  R is selected from alkyl, cycloalkyl, aryl and haloalkyl;
  ED is an electron donor selected from alkyl and aromatic carboxylic acids, esters, ketones, amines and alcohols;
  X is selected from chloride, bromide, fluoride and $RCO_2$.

The solutions proposed in both the English and American documents however have some disadvantages.

In fact for the solution proposed by GB'355 both the Aluminium and the Vanadium necessary for the polymerization are totally deposited on the inert support. In other words, the supported catalyst described in the English patent is not a catalytic component, but a real catalyst which excludes the use of other cocatalysts. In addition the solution proposed in this document can only be used in polymerization in gas phase, not in a liquid one.

As far as the supported catalytic component described in U.S. Pat. No. 5,002,916 is concerned, this relates to a component which uses particularly valuable raw materials, requires a particularly difficult preparation process and in addition the elastomeric compositions which can be obtained have the inconvenience of having a certain degree of crystallinity.

A catalytic component for the preparation of EP elastomers has now been found which overcomes the above disadvantages.

In accordance with this the present invention relates to a process for the polymerization of ethylene with propylene and optionally another diene, said process being carried out in a suspension of a liquid monomer, in the presence of a catalyst containing Vanadium and a cocatalyst basically consisting of an organic compound of Aluminium and optionally in the presence of a halogenated promotor, characterized in that the catalyst containing Vanadium is supported on an inert matrix and is prepared by:

a) impregnation of an inert support with a solution, in hydrocarbons or halohydrocarbons, of a Vanadium compound with an oxidation state of between 3 and 5;

b) possible removal, from the impregnated support obtained in step (a), of the solvent used in step (a);

c) treatment of the inert material impregnated with Vanadium of step (a) or (b), with a hydrocarbon solution of a compound having general formula (I) $R_nAlX_m$ wherein R is a $C_1$–$C_{20}$ alkyl radical, X is a halogen, n+m=3, and m is an integer from 0 to 2, the above step (c) being carried out in an inert atmosphere, preferably in an atmosphere of ethylene or alpha-olefins, the molar ratio between Aluminium of step (c) and Vanadium of step (a) being between 1/1 and 6/1, preferably between 1.5/1 and 3.0/1.

d) optional separation and purification of the catalyst containing Vanadium obtained in step (c).

The term inert matrix refers to inorganic oxides and mixed oxides such as silica, alumina, Magnesium oxide, Titanium oxide and aluminium silicates; carbon black; zeolites; silicon carbide; minerals containing magnesium, aluminium and silicon, such as talc and kaolin alumina, Magnesium oxide. The term inert matrix also refers to inert polymeric supports, such as stryrene-divinylbenzene copolymer.

The above inert supports preferably have an average diameter of between 5 and 400 $\mu$, preferably between 10 and 120 $\mu$; in fact it may be difficult to transport and suspend very large particles in the solvent whereas, on the other hand, it may be difficult to recover very fine particles.

The inert support has a sufficient quantity of sites on the surface to fix the catalyst by complexation or chemical bond. It is preferable for the inert support to have a high surface area and porosity which allow free access of the reagents to the catalytic sites. Surface areas of between 10 and 1000 $m^2/g$ and a porosity of between 0.1 and 4 ml/g are therefore preferable, and a porosity of between 1.0 and 2.5 ml/g is even more preferable.

In the preferred form of embodiment, the inert matrix is selected from alumina and silica, silica is even more preferable.

It is well known that inorganic oxides can contain water absorbed on the surface. As water is poisoning for the catalyst, it is necessary to subject the inert support to thermal treatment to reduce the content of water to very low levels, usually less than 2000 ppm, preferably less than 1000 ppm. In addition it is also preferable to eliminate traces of Oxygen from the pores of the support, for example by evacuating and pressurizing the above support various times with a dry inert gas, for example nitrogen or ethylene itself.

In step (a) the Vanadium compound is dissolved in a solvent selected from hydrocarbons and halohydrocarbons; typical examples of hydrocarbon solvents are toluene, benzene, heptane; typical examples of halohydrocarbons are dichloromethane, carbon tetrachloride, tri or tetrachloroethane. Other solvents or co-solvents, for example ethers, however can also be used, provided that the quantity does not jeopardize the solubility of the Vanadium compound.

In the preferred form of embodiment the solvent is dichloromethane.

The Vanadium compound used in step (a) is a Vanadium salt soluble in hydrocarbons in which the valence of Vanadium is between 3 and 5. Mixtures of these Vanadium compounds can obviously be used. Non-limiting examples of these compounds are:

Vanadyl trihalides, alkoxyhalides and alkoxides such as $VOCl_3$, $VOCl_2(OBu)$ and $VO(OC_2H_5)_3$;

Vanadium tetrahalides and Vanadium alkoxyhalides such as $VCl_4$ and $VCl_3(OBu)$;

Vanadium and Vanadyl acetyl acetonates and chloro acetyl acetonates, such as $V(AcAc)_3$, $VOCl_2(AcAc)$, $VO(AcAc)_2$ wherein (AcAc) is an acetylacetonate;

Complexes between Vanadium halide and Lewis bases such as $VCl_3.2THF$ wherein THF is tetrahydrofuran.

In the preferred form of embodiment the Vanadium is V(III) acetyl acetonate.

The quantity of Vanadium reacted with the inert support is almost totally adsorbed on the matrix itself.

At the end of step (a) the inert support has a content of Vanadium of between 0.01 and 1 mmole of Vanadium per gram of support, preferably between 0.1 and 0.5 mmoles per gram of support.

The impregnation operation (step a), is carried out by putting the inert support in contact, preferably under stirring, with the solution of Vanadium compound. This operation is normally carried out at a temperature of between 10 and 40° C. and for a time which depends on the concentration and quantity of Vanadium; a time of between 5 minutes and 2 hours is usually sufficient to ensure impregnation of the inert matrix, but higher times do not cause any inconvenience. Step (a) is carried out in an environment of inert gas, for example in an atmosphere of nitrogen, argon or helium.

The above step (a) is carried out by putting the inert support in contact with a solution of Vanadium, the volume of the above solution preferably being about the same as the total porosity of the inert support.

Operating in this way, at the end of step (a) a humid but flowing powder is obtained which can be dried or used as such. A much higher volume can be used however, which is then dried.

When step (a) has been carried out, the dispersion thus obtained can be used as such for step (c), or the solvent can be removed (step b) from the solid obtained in step (a). This can be carried out with the conventional techniques, for example by filtration and subsequent drying of the solid, or by simple drying of the impregnated solid obtained in step (a).

As in step (a), also step (c) is carried out in an inert atmosphere. However, in a preferred form of embodiment, step (c) is carried out in an atmosphere of ethylene, or a mixture of ethylene and alpha-olefin, the latter in liquid or gas form, so as to cover the support granule with a layer of homo or copolymer, thus obtaining a prepolymerized catalyst.

Among the compounds having general formula (I) $R_nAlX_m$ wherein R is a $C_1$–$C_{20}$ alkyl radical, X is a halide, n+m=3, and m is an integer from 0 to 2, which can be used in step (c), alkyl Aluminium chlorides, such as $Al(C_2H_5)_2Cl$, $Al(C_2H_5)Cl_2$ are particularly useful, the most preferred being diethylaluminium chloride (DEAC).

The catalytic component obtained in step (c) can be used in the polymerization phase as it is obtained, or it can preferably be separated and purified with the normal separation and purification techniques, for example filtration and washing.

The catalytic component thus prepared at the end of step (c) is used in the preparation of EP copolymers together with a cocatalyst having general formula (I). The above cocatalyst can be the same as or different from the organic compound of Aluminium used in step (c). Dialkyl Aluminium chlorides, particularly diethylaluminium chloride, are particularly useful as cocatalyst. The molar ratio between cocatalyst and Vanadium can vary from 5 to 1000, preferably from 9 to 60.

In the copolymerization process, as well as the supported catalyst of the present invention and cocatalyst, it is preferable, as known to experts in the field, also to use a catalysis activator. These activators usually belong to the group of chlorinated organic compounds, for example ethyl trichloroacetate, n-butyl perchlorocrotonate, diethyl dichloromalonate, carbon tetrachloride, chloroform. The molar ratio between activator and Vanadium can vary from 0/1 to 1000/1, preferably from 0.5/1 to 40/1, even more preferably from 1/1 to 10/1.

The process of the present invention relates to the copolymerization of ethylene with higher alpha-olefins.

The process of the present invention is carried out in suspension, in a reaction medium (in a liquid or gas phase, but preferably in a liquid phase) in which the polymer is basically insoluble. In the preferred form of embodiment the reaction medium prevalently consists of one of the comonomers, to which a saturated hydrocarbon, such as propane, butane, pentane or hexane or aromatics, preferably propane, is optionally added as diluent.

The polymerization temperature is maintained at between –5° C. and 65° C., preferably between 25 and 50° C. The contact times vary from 10 minutes to 6 hours, preferably from 30 minutes to 1 hour.

The polymerization is generally carried out in the presence of hydrogen as moderator and regulator of the molecular weight, operating at a total pressure of between 5 and 10 bars, preferably between 8 and 30 bars, with a ratio between partial pressure of ethylene and partial pressure of hydrogen of more than 4, preferably higher than 20. Other components can however be used as molecular weight regulators, for example diethylzinc.

The elastomeric copolymers which can be obtained with the process of the present invention contain from 35% to 85% by weight of ethylene, preferably from 45% to 75% by weight and have a Mooney viscosity, ML1+4 at 125° C., of between 5 and 120, preferably between 15 and 90.

The term higher alpha-olefins means alpha-olefins having a number of carbon atoms of between 3 and 10, for example propylene, butene-1, pentene-1. In particular the process of the present invention relates to elastomeric ethylene-propylene copolymers.

As is known to experts in the field, ethylene and higher alpha-olefins can be copolymerized with other monomers to give elastomeric terpolymers (EPDM). These termonomers can be selected, as known to experts in the field, from:

dienes with a linear chain such as 1,4-hexadiene and 1,6-octadiene;

acyclic dienes with a branched chain such as 5-methyl-1,4-hexadiene; 3,7-dimethyl-1,6-octadiene; 3,7-dimethyl-1,7-octadiene; dihydro myrcene and dihydrocymene;

alicyclic dienes with a single ring such as 1,4-cyclohexadiene; 1,5-cyclooctadiene; 1,5-cyclododecadiene;

dienes having condensed and bridged alicyclic rings such as methyltetrahydroindene; dicyclopentadiene; bicyclo-(2,2,1-)-hepta-2,5-diene; alkenyl, alkylidene, cycloalkenyl and cycloalkylidene norbornenes such as 5-methylene-2-norbornene (MNB); 5-ethylidene-2-norbornene (ENB); 5-propenyl-2-norbornene; 5-isopropenyl-2-norbornene; 5-(4-cyclopentenyl)2-norbornene; 5-cyclohexylidene-2-norbornene.

Among the non conjugated dienes typically used for preparing these copolymers, dienes containing at least one double bond in a tensioned ring are preferred. The third monomer which is mostly preferred is 5-ethylidene-2-norbornene (ENB).

Apart from the minimum fouling of the autoclave, the process of the present invention allows copolymers to be produced which, with the same composition, have a lower crystallinity than those of the prior art.

The following examples provide a better understanding of the present invention.

EXAMPLES

All the reagents are commercially produced; the solvents and liquid activators were deaerated under nitrogen and anhydrified on alumina or molecular sieves.

The organic compounds of aluminium were used in a dilute solution in hexane.

The copolymers obtained in the following examples were characterized as follows:

A) Composition and reactivity ratio: These were determined by infrared analysis of the polymer in the form of films with a thickness of 0.2 mm using a Perkin Elmer FTIR spectrophotometer 1760 model.

The propylene content was determined by measuring the ratio between the absorbances of bands 4390 and 4255 $cm^{-1}$ and using a calibration curve calibrated with standard polymers.

The $r_1*r_2$ product was determined with the spectroscopic method described in literature (European Polymer Journal, 4, pages 107–114 (1968).

B) ML Mooney viscosity (1+4): this was determined at 100 and 125° C. according to the method ASTM D1646-87.

C) The melting heat, correlated to the crystallinity of the copolymer was determined by DSC with the instrument Perkin-Elmer DSC7 in an inert atmosphere and with a scanning rate of 20° C./min.

D) The evaluation of the fouling of the polymerization reactor was determined by observing the morphology of the product at the end of the polymerization, after evaporation of the reaction medium.

When there is no presence of particles, the classification is "D".

When the polymer is present in the form of particles ennobled (molten) in the polymeric mass, the classification is "C".

When the polymer is present in the form of separate but attached particles, the classification is "B".

When the polymer is present in the form of separate and free-flowing particles, the classification is "A".

Comparative Example 1

Ethylene Propylene Copolymerization.

830 grams of liquid propylene were charged into a perfectly anhydrous 2.8 $dm^3$ autoclave equipped with a propeller stirrer. The autoclave is thermostat-regulated at about 40° C., saturated with ethylene until an overpressure of 3.5 bars is reached and then with a further overpressure of 0.1 bars of hydrogen. The total pressure in the top of the autoclave was 19.1 bars.

A hexanic solution containing 3.24 mmoles of DEAC (diethylaluminium chloride) and subsequently 0.0625 mmoles of Vanadium (III) acetylacetonate and 0.468 mmoles of ethyl trichloroacetate dissolved in toluene were then charged into the autoclave.

The reaction is carried out at a constant temperature, feeding the ethylene in continuous in order to keep the total pressure constant.

After 40 minutes, when the reaction was complete the monomers were evaporated and the autoclave was opened. Fouling classification: "D".

48 grams of polymer were recovered equal to 15 Kg of polymer per gram of Vanadium. The characterizations are shown in table 1.

Comparative Example 2

A) Catalyst Pretreatment

10 $cm^3$ of a toluene solution containing 0.153 mmoles of Vanadium (III) acetylacetonate with 0.306 mmoles of DEAC (molar ratio Al/V=2), are put in precontact at room temperature in a tailed test-tube, under nitrogen and magnetic stirring.

B) Copolymerization of Ethylene and Propylene 913 grams of liquid propylene are charged into a perfectly anhydrous 3.3 $dm^3$ autoclave equipped with a propeller stirrer.

The autoclave is thermostat-regulated at about 40° C., saturated with ethylene until an overpressure of 3.5 bars is reached, and then with a further overpressure of 0.1 bars of hydrogen. The total pressure in the top of the autoclave is 18.8 bars.

A hexane solution containing 2.52 mmoles of DEAC and subsequently an aliquot of the solution previously prepared containing 0.0459 mmoles of Vanadium are then introduced together with 0.36 mmoles of ethyl trichloroacetate dissolved in toluene. The reaction was carried out at a constant temperature, the ethylene being fed in continuous to keep the total pressure constant. After 60 minutes, the monomers were evaporated and the autoclave was opened; Fouling classification "D".

42 grams of polymer were recovered equal to a yield of 17.9 kg of polymer per gram of Vanadium. The characterizations are shown in Table 1.

Example 3

A) Preparation of the Catalyst 5.1 grams of silica, previously anhydrified at 650° C. for 4 hours under vacuum, were slowly impregnated under nitrogen and mechanical stirring, with a solution containing 2.66 mmoles of Vanadium (III) acetylacetonate in a volume of toluene approximately equal to the volume of the pores of the support.

After 30 minutes of stirring, 6.64 mmoles of DEAC in 50 $cm^3$ of hexane were rapidly added. Stirring was carried out at room temperature for about 25 minutes and then the whole mixture was left to decant. The liquid proved to be perfectly colourless. The solid thus separated is dried under vacuum and 6.8 grams of powder are obtained, having a Vanadium content of 1.98%.

B) Copolymerization of Ethylene and Propylene

The same procedure is carried out as in example 2, except that 4.3 mmoles of DEAC and subsequently 0.2 grams of the catalyst prepared in step (a) suspended in 25 ml of hexane and 0.79 mmoles of activator, are fed.

After 60 minutes the monomers are evaporated and the autoclave is opened: Classification "C".

80 grams of polymer are recovered equal to a yield of 20.1 kg of polymer per gram of Vanadium. The characterizations are shown in table 1.

Example 4

A) Preparation of the Prepolymerized Catalyst 5.2 grams of silica, dehydrated at 650° C. for 4 hours under nitrogen, were slowly impregnated under pressurization of ethylene and mechanical stirring, with a solution containing 2.74 mmoles of Vanadium (III) acetylacetonate in a volume of toluene equal to the approximate volume of the pores of the support.

After 30 minutes of stirring, 6.9 mmoles of DEAC in 50 ml of hexane are rapidly added. The mixture is left at room temperature for about 120 minutes and is then left to decant: the liquid proves to be perfectly colourless. The liquid is separated, washed twice and dried under vacuum to obtain 7.82 grams of powder containing 1.8% of Vanadium.

B) Copolymerization of Ethylene and Propylene

The same procedure is carried out as in example 2, except that 4.3 mmoles of DEAC and subsequently 0.222 grams of the catalyst prepared in step (a) suspended in 25 cm³ of hexane and 0.78 mmoles of activator, are fed.

After 60 minutes the monomers are evaporated and the autoclave is opened: Classification "B".

77 grams of polymer are recovered equal to a yield of 19.3 kg of polymer per gram of Vanadium. The characterizations are shown in table 1.

Example 5

908 grams of liquid propylene are charged into a perfectly anhydrous 3.3 dm³ autoclave equipped with a propeller stirrer. The autoclave is thermostat-regulated at 40° C. and then saturated with ethylene until an overpressure of 4 bars is reached; a further overpressure of 0.1 bars of hydrogen is added. The total pressure in the top of the autoclave is 19.5 bars.

A hexanic solution containing 4.56 mmoles of DEAC and subsequently 0.236 grams of the catalyst of example 4, suspended in hexane containing 0.84 mmoles of ethyl trichloroacetate were then introduced. The reaction is carried out at a constant temperature, feeding the ethylene in continuous in order to keep the total pressure constant.

After 60 minutes, the monomers were evaporated and the autoclave was opened. Fouling classification: "B".

61 grams of polymer were recovered equal to 14.4 Kg of polymer per gram of Vanadium. The characterizations are shown in table 1.

Example 6

A) Preparation of Prepolymerized Catalyst 5.09 grams of silica, dehydrated at 650° C. for 4 hours under nitrogen, were impregnated under pressurization of nitrogen and mechanical stirring, with a solution containing 2.50 mmoles of Vanadium (III) acetylacetonate in a volume of dichloromethane approximately equal to the volume of the pores of the support.

After stirring for 10 minutes the catalyst was dried.

It was then saturated with ethylene. 6.25 mmoles of DEAC in 50 cm³ of hexane were then rapidly added. The mixture was left to react at room temperature for about 60 minutes and was then decanted. The liquid proved to be perfectly colourless. After separation of the liquid, the solid was dried at reduced pressure and 6.75 grams of powder containing 1.8% of vanadium were obtained.

B) Copolymerization of Ethylene and Propylene 810 grams of liquid propylene are charged into a perfectly anhydrous cylindrical 2.8 dm³ autoclave equipped with a propeller stirrer. The autoclave is thermostat-regulated at 40° C., saturated with ethylene up to an overpressure of 4 bars, and subsequently charged with a further overpressure of 0.1 bars of hydrogen. The total pressure in the top of the autoclave is 19.6 bars.

A hexane solution containing 5.4 mmoles of DEAC and subsequently 0.255 grams of the catalyst previously prepared in hexane containing 0.7 mmoles of ethyl trichloroacetate were then introduced. The reaction is carried out at a constant temperature, feeding the ethylene in continuous in order to keep the total pressure constant.

After 60 minutes, the monomers were evaporated and the autoclave was opened. Fouling classification: "A/B" in the sense that the particles present on the surface are easily separated.

92 grams of polymer were recovered equal to 20 Kg of polymer per gram of Vanadium. The characterizations are shown in table 1.

Example 7

A) Preparation of the Prepolymerized Catalyst 5.21 grams of silica dehydrated for 4 hours under nitrogen were impregnated under pumping of nitrogen and mechanical stirring with a solution containing 1.95 mmoles of Vanadium (III) acetylacetonate in dichloromethane.

The mixture is left to evaporate at 40° C. in a nitrogen stream under stirring for 30 minutes.

It is then saturated with ethylene at atmospheric pressure. 4.87 mmoles of DEAC in 50 ml of hexane were then rapidly added. It was immediately observed that the apparatus tended to go under vacuum, for about 230 minutes, at room temperature, then the mixture was left to decant. The liquid proved to be perfectly colourless. It was dried under reduced pressure and 7.44 grams of powder containing 1.34% of Vanadium were obtained.

B) Copolymerization of Ethylene and Propylene 790 grams of liquid propylene are charged into a perfectly anhydrous cylindrical 2.8 dm³ autoclave equipped with a propeller stirrer. The autoclave is thermostat-regulated at 40° C. and then saturated with ethylene until an overpressure of 5 bars is reached and then with hydrogen until an overpressure of 0.1 bars is reached. The total pressure in the top of the autoclave is 20.5 bars.

A hexanic solution containing 5.7 mmoles of DEAC and subsequently 0.45 grams of the catalyst previously prepared in hexane containing 0.9 mmoles of ethyl trichloroacetate were then introduced. The reaction is carried out at a constant temperature, feeding the ethylene in continuous in order to keep the total pressure constant.

After 60 minutes, the monomers were evaporated and the autoclave was opened. Fouling classification: "A/B" in the sense that the particles present on the surface are easily separated.

127 grams of polymer were recovered equal to 21.1 Kg of polymer per gram of Vanadium. The characterizations are shown in table 1.

TABLE 1

| test | w % prop. | $r_1 * r_2$ | ML 100° C. | ML 125° C. | H J/g | Morph. class |
|---|---|---|---|---|---|---|
| 1 (c) | 39.1 | 1.46 | — | 36 | 3.8 | D |
| 2 (c) | 36.0 | 1.16 | — | 65 | 2.4 | D |
| 3 | 37.1 | 1.14 | 93 | 62 | 2.88 | C |
| 4 | 37.7 | 1.22 | 69 | — | 0.93 | B |
| 5 | 33.2 | 0.75 | — | 67 | 2.01 | B |
| 6 | 36.2 | 0.90 | — | 50 | 1.62 | A/B |
| 7 | 34.3 | 1.18 | — | 65 | 2.51 | A/B |

It should be noted that in the compositive range from 66.8 to 62.3% by weight of ethylene, with the process of the present invention crystallinities of 1.07%, 0.34% and 0.92% respectively (examples 4, 5 and 7) are obtained. These values were determined by dividing the melting heat by 272 j/g, as indicated in the experimental part of U.S. Pat. No. 5,002,916.

For compositions going from 61.4% to 66.4% of ethylene, U.S. Pat. No. 5,002,916 obtains a crystallinity of between 4.6% and 8.2%. More specifically US'916 obtains the following results:

with 66.4% of ethylene a crystallinity of 7.5% is obtained;
with 65.7% of ethylene a crystallinity of 8.2% is obtained;
with 61.7% of ethylene a crystallinity of 4.6% is obtained;
with 61.4% of ethylene a crystallinity of 6.5% is obtained.

Comparative Example 8

A catalyst as described in GB-A-2.105.355 is prepared.

A gram of silica (equal to that used in the previous samples) and 100 cc of anhydrous hexane are put into a 100 cc tailed test-tube under vacuum and magnetic stirring.

0.24 grams (2 mmoles) of DEAC are then added and the mixture is gently stirred for 30 minutes. The solvent is then evaporated at room temperature until a free-flowing powder is obtained.

0.1 mmoles of Vanadium (III) acetylacetonate dissolved in 10 cc of anhydrous toluene are added (molar ratio Al/V=20).

The mixture left under stirring for 30 minutes, and the solvent is then evaporated at room temperature until a free-flowing catalyst is obtained.

1.2 grams of catalyst containing 0.0051 grams of Vanadium are thus obtained.

The catalyst thus obtained was tested under the same conditions as example 6 with the difference that the DEAC was only used for cleansing (about 0.7 mmoles) and all the catalyst previously prepared was used.

Only 3.0 grams of copolymer were obtained with a yield of 0.59 kg of polymer per gram of Vanadium.

Comparative Example 9

With the same method described in comparative example 8, a catalyst was prepared using a greater quantity of Al-alkyl in the synthesis, in order to have a final ratio Al/V=52.

The catalyst thus obtained was tested under the same conditions as the previous example and 3.5 grams of polymer were obtained equal to a yield of 0.69 kg of polymer per gram of Vanadium.

Comparative examples 8 and 9 show that the catalysts described in GB-A-2.105.355, which are efficient in copolymerization in a gas phase, are not efficient in mass polymerization.

What is claimed is:

1. Process for the polymerization of ethylene with propylene, said process being carried out in a suspension of a liquid monomer, in the presence of a catalyst containing Vanadium and a cocatalyst consisting of an organoaluminum compound and optionally in the presence of a halogenated promoter, characterized in that the catalyst containing Vanadium is supported on an inert matrix and is prepared by:

a) impregnation of an inert support with a solution, in hydrocarbons or halohydrocarbons, of Vanadium (III) acetylacetonate;

b) possible removal, from the impregnated support obtained in step (a), of the solvent used in step (a);

c) treatment of the inert material impregnated with Vanadium of step (a) or (b), with an organoaluminum hydrocarbon solution of a compound having general formula (I) $R_nAlX_m$ wherein R is a $C_1$–$C_{20}$ alkyl radical, X is a halogen, n+m=3, and m is an integer from 0 to 2, the above step (c) being carried out in an atmosphere of ethylene or alpha-olefins, the molar ratio between Aluminium of step (c) and Vanadium of step (a) being between 1/1 and 6/1 d) optional separation and purification of the catalyst containing Vanadium obtained in step (c).

2. Process according to claim 1, characterized in that the solvent of step (a) is dichloromethane.

3. Process according to claim 1, characterized in that the inert matrix is silica.

4. Process according to claim 1, characterized in that the compound having general formula (I) is diethylaluminium chloride.

5. Process according to claim 1, characterized in that the molar ratio between Aluminium of step (c) and Vanadium of step (a) is from 1.5/1 to 3.0/1.

6. Process according to claim 5, characterized in that at the end of step (a) or (b) the inert support has a Vanadium content of between 0.01 and 1 mmoles of Vanadium per gram of support.

7. Process according to claim 5, characterized in that the Vanadium content is between 0.1 and 0.5 mmoles of Vanadium per gram of support.

8. The process of claim 1, wherein polymerization of ethylene with propylene is conducted in the presence of a diene.

9. The process of claim 8, wherein said diene is selected from the group consisting of 1,4-hexadiene, 1,6-octadiene, 5-methyl-1,4-hexadiene, 3,7-dimethyl-1,6-octadiene, 3,7-dimethyl-1,7-octadiene, dihydro myrcene, dihydrocymene, methyltetrahydroindene, dicyclopentadiene, bicyclo-(2,2,1-)-hepta-2,5-diene, 5-methylene-2-norbornene, 5-ethylidene-2-norbornene, 5-propenyl-2-norbornene, 5-isoproenyl-2-norbornene, 5-(4-cyclopentenyl)2-norbornene, and 5-cyclohexylidene-2-norbornene.

10. The process of claim 1, wherein said support is a dehydrated inert support.

* * * * *